United States Patent [19]

Hansen

[11] Patent Number: 4,790,117
[45] Date of Patent: Dec. 13, 1988

[54] METHOD OF MOLDING, FILLING AND SEALING A CONTAINER

[76] Inventor: Gerhard Hansen, Heerstrasse 20, 7166 Sulzbach-Laufen am Kocher, Fed. Rep. of Germany

[21] Appl. No.: 737,476

[22] Filed: May 24, 1985

Related U.S. Application Data

[60] Continuation of Ser. No. 509,040, Jun. 29, 1983, which is a division of Ser. No. 289,170, Aug. 3, 1981, Pat. No. 4,425,090.

[30] Foreign Application Priority Data

Sep. 19, 1980 [DE] Fed. Rep. of Germany ....... 3033821

[51] Int. Cl.⁴ .................. B65B 3/02; B65B 43/00; B65B 61/18; B65B 61/22
[52] U.S. Cl. .................................. 53/410; 53/412; 53/420; 53/452; 53/140; 53/128; 53/133; 53/558; 264/524; 264/525; 425/524
[58] Field of Search .............. 53/128, 129, 133, 140, 53/410, 412, 420, 452, 453, 558, 559; 425/524; 264/523-525; 215/1 C, 31-33

[56] References Cited

U.S. PATENT DOCUMENTS

| | | | |
|---|---|---|---|
| Re. 27,155 | 7/1971 | Hansen | 425/524 |
| 2,372,181 | 3/1945 | Barr | 215/33 |
| 3,251,915 | 5/1966 | Pechthold | 264/524 |
| 3,409,710 | 11/1968 | Klygis | 264/524 X |
| 3,597,793 | 8/1971 | Weiler et al. | 425/524 X |
| 3,690,803 | 9/1972 | Pechtold et al. | 53/453 X |
| 3,851,029 | 11/1974 | Cornett, III et al. | 264/525 |
| 3,919,374 | 11/1975 | Komendowski | 425/524 X |
| 3,969,455 | 7/1976 | Moller | 425/524 X |
| 4,176,153 | 11/1979 | Weiler et al. | 425/524 X |
| 4,207,990 | 6/1990 | Weiler et al. | 215/32 X |
| 4,226,334 | 10/1980 | Weiler et al. | 150/55 X |
| 4,341,317 | 7/1982 | Suzuki et al. | 215/31 |
| 4,425,090 | 1/1984 | Hansen | 425/524 X |
| 4,707,966 | 11/1987 | Weiler et al. | 53/410 |

Primary Examiner—Sue A. Weaver
Attorney, Agent, or Firm—Roylance, Abrams, Berdo & Goodman

[57] ABSTRACT

In a process for the manufacture of a filled and closed container made of a heat-sealable plastic hose, particularly polyethylene, in one work operation, the plastic hose is expanded to become a container body, the body is filled and the upper part of the container is shaped when the container is closed. So that it will be possible to manufacture filled and closed containers with rubber stoppers in one work operation, after the filling process and before the closing process, the upper or head part of the container is closed by a rubber stopper, closing off the body so that a part of the rubber stopper projects into the part of the plastic hose which is still to be shaped, which is then shaped to conform to the outer circumference of the rubber stopper and, after the shaping process, the upper part of the container is closed off outside of the rubber stopper.

1 Claim, 3 Drawing Sheets

METHOD OF MOLDING, FILLING AND SEALING A CONTAINER

This is a continuation of application Ser. No. 509,040 filed June 29, 1983, which is a division of application Ser. No. 289,170 filed Aug. 3, 1981 now U.S. Pat. No. 4,425,090.

This invention relates to a process and apparatus for producing a container from a hose or tube of heatsealable synthetic polymeric material such as polyethylene, the container being filled, provided with a stopper and heat-sealed closed in one work operation, and to a container made by the process and apparatus.

BACKGROUND OF THE INVENTION

A container having a predetermined, lasting shape can be produced using a known process and known apparatus as described in German AS No. 2,255,869 and employing a calibration pin in the area of the head of the container.

It is also known to produce, fill and close a container in one work operation, using a heat-sealable plastic hose, wherein a rubber stopper is inserted in the bottom of the container in such a way that the stopper is surrounded by the material of the container only on its outer circumference, leaving the outside face of the stopper exposed, as a consequence of which the Stopper can get dirty. The stopper is not inserted or seated in the container tightly enough, with the result that bacteria from the outside can grow into the container.

It is also known to produce a filled and closed container the head of which contains an inserted rubber stopper which is closed off completely from the outside by the container. However, that container is made of two parts which are joined together after the manufacture, filling and closing of the major, bulging body portion of the container with the head which receives the rubber stopper being welded to the closed, bulging portion of the container. In this arrangement, even when a breakable seal is used, the closed bulging portion of the container must be pierced by the injection needle during use which can result in cutting out a part of the material of the bulging portion of the container and clogging of the injection needle.

BRIEF DESCRIPTION OF THE INVENTION

An object of the invention is to provide a method of forming a filled and closed container having a rubber stopper wherein the container is formed and closed in one work operation, and is of seamless construction Briefly described, the invention includes a process for the manufacture of a filled and closed container made from a heat-sealable hose of polymeric material such as polyethylene in a single operation of the type wherein the hose is expanded to become a container, the body portion of the container is filled and its upper head portion is shaped when the container is closed, comprising the steps of inserting a rubber stopper into the head portion after the container portion is filled and before the head portion thereof is closed so that the stopper closes off the lateral section of the container and a portion of the stopper extends into the head portion which is still to be shaped, shaping the head portion surrounding the rubber stopper so that at least part of the material of the head portion conforms to and encloses the outer circumference of the stopper, and sealing the outer portion of the head portion outside of the stopper.

In another aspect the invention comprises an improved apparatus for forming, filling and closing a container by expanding and shaping a heat-sealable polymeric hose, the apparatus being of the type having a container-forming mold with split upper and lower parts, and a mold-holding fixture for each of the upper mold parts movable in opposite directions, the improvement comprising means movable at least vertically to within the hose for releaseably holding a rubber stopper; a cross slide for supporting said means for holding said stopper for horizontal movement relative to said mold, whereby said means for holding can be moved to a receiving position for engaging a stopper and to a position in said hose for placing the stopper therein.

The invention also includes a filled container made of thermoformable polymeric material comprising a body portion, a head portion and a stopper wherein said stopper is inserted into said body portion in closing relationship therewith after forming and filling said body portion, and said head portion is shaped around the circumference of said stopper and sealed to enclose said stopper, said container being of unitary seamless construction.

In order that the manner in which the foregoing and other objects are attained in accordance with the invention can be understood in detail particularly advantageous embodiments thereof will be described with reference to the accompanying drawings, which form a part of this specification and wherein.

Figure 1:
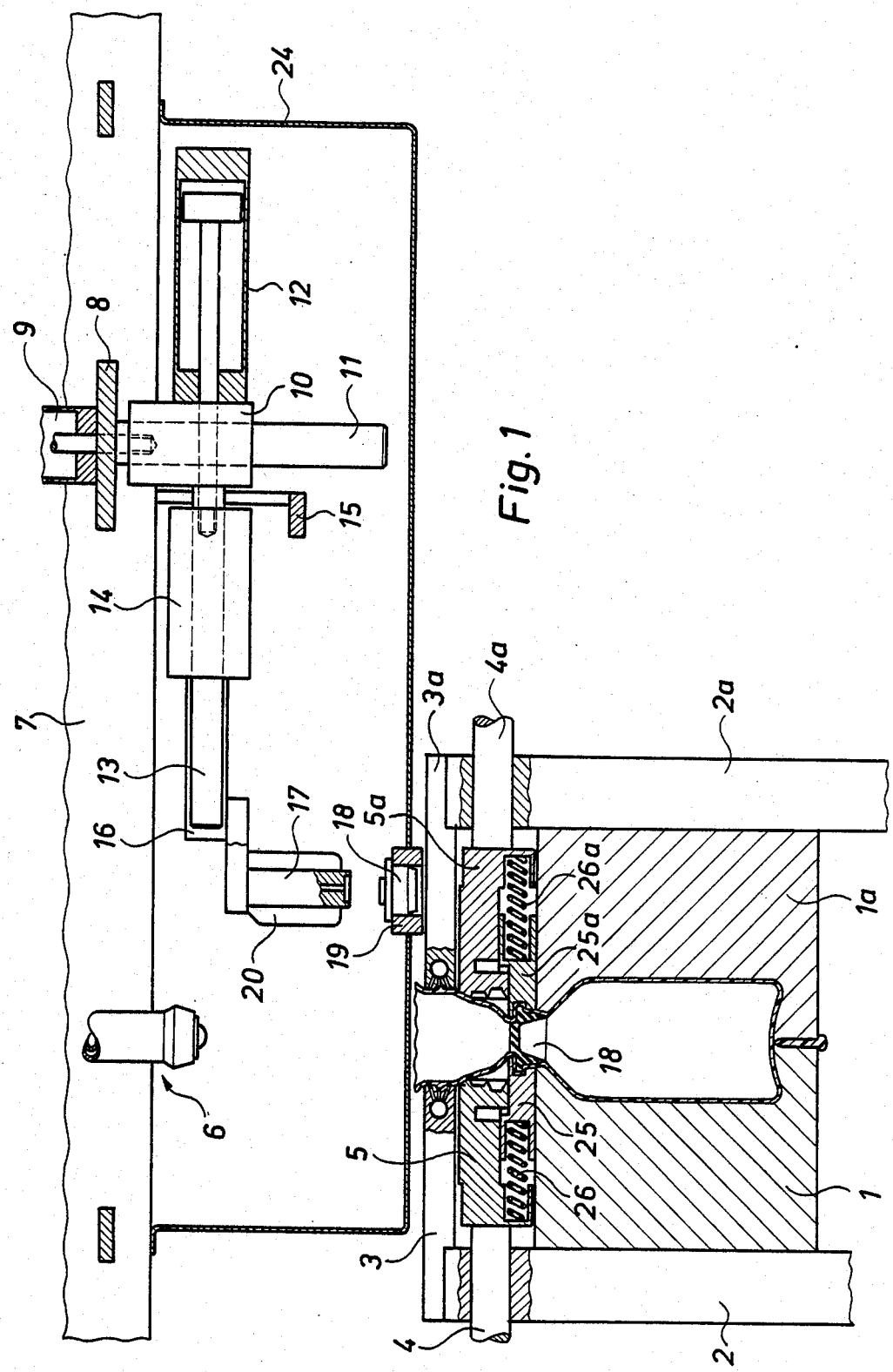
FIG. 1 is a partial side elevation, in partial section, of an apparatus in accordance with the invention along line I—I of FIG. 2.

As will be recognized by those skilled in the art, a portion of the apparatus employed in accordance with the present invention is known from, for example, the previously mentioned German AS No. 2,255,869, and includes two lower mold parts 1 and 1a which are horizontally movable and which can be opened and closed, the mold halves 1, 1a being supported respectively on plate-like supporting pieces 2 and 2a which can be moved toward and away from each other by arrangements such as piston and cylinder assemblies, not shown. A vacuum holding fixture having portions 3, 3a is fastened to the upper ends of both of the connecting pieces 2, 2a. Vacuum holding fixtures 3, 3a describe a circle and extend up to each other. Between lower mold part and vacuum holding mixture 3, is positioned a top mold part 5 which is attached to a piston rod 4 passing through connecting piece 2 and being connected to a piston and cylinder arrangement, not shown, which is positioned in such a way that mold portion 5 can be moved horizontally. Similarly, between lower mold part 1a and vacuum holding fixture 3a, there is a top mold part 5a which is also fastened to a piston rod 4a of a piston and cylinder assembly, not shown.

Figure 2:
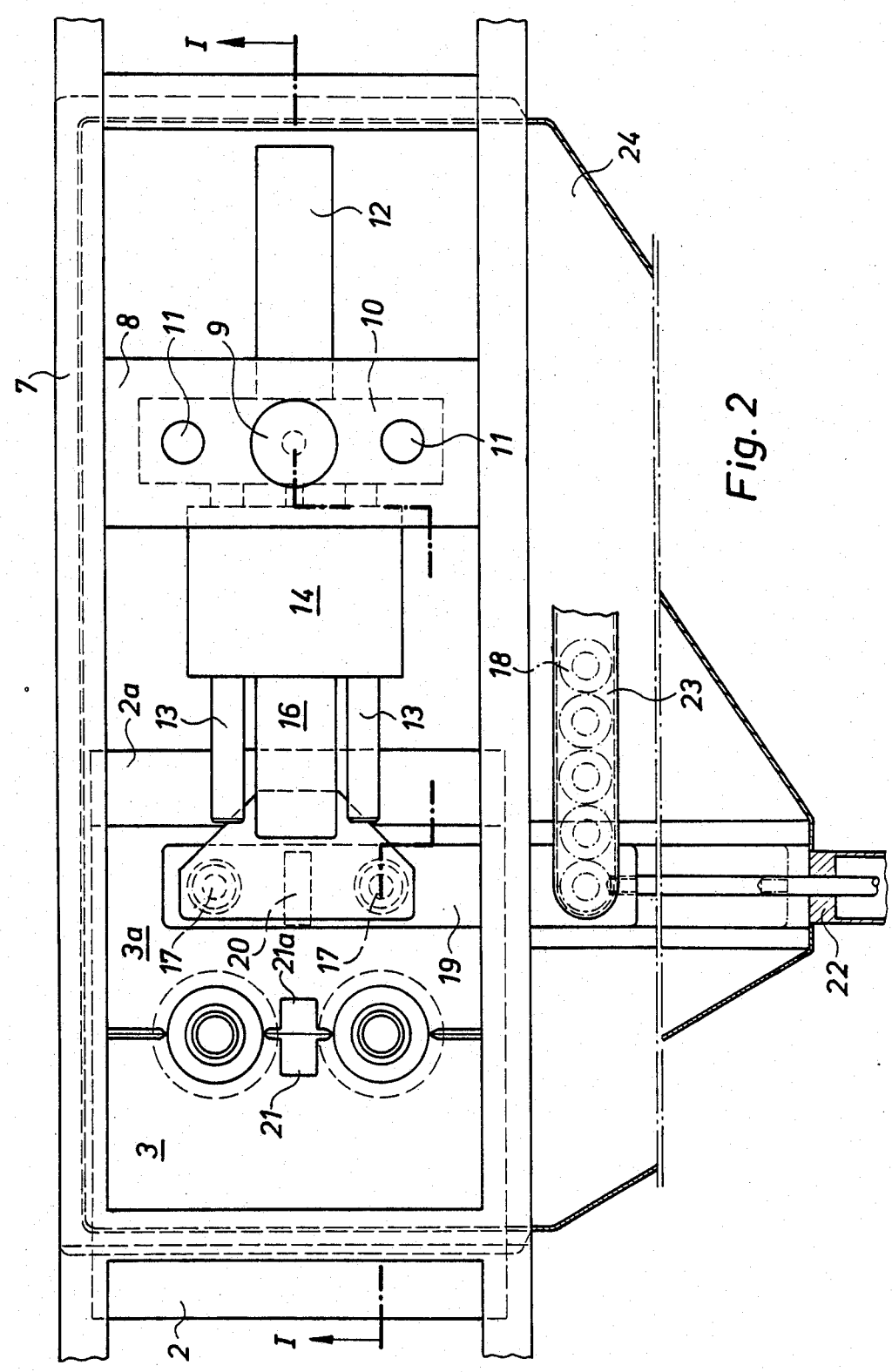
FIG. 2 is a partial top plan view of the apparatus of FIG. 1.
Figures 3, 4:
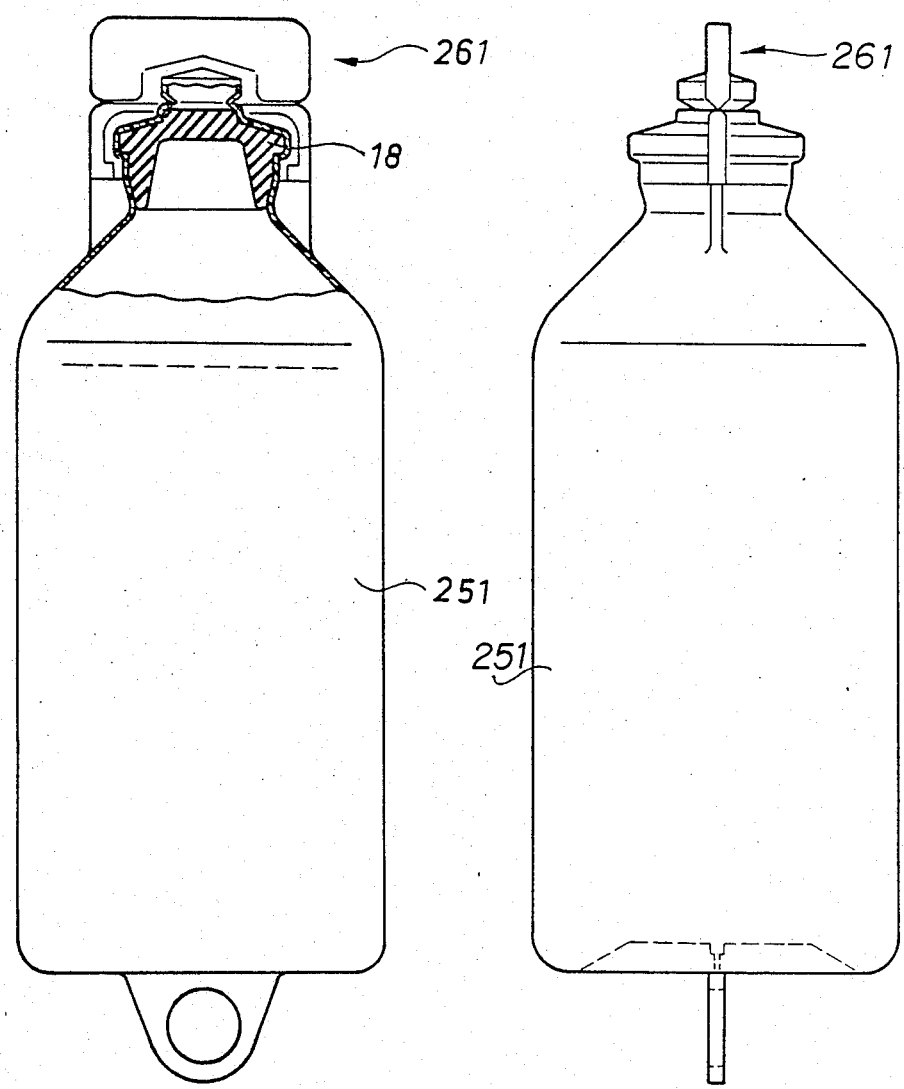
FIG. 3 is a front elevation, in partial section, of a container in accordance with the invention.
FIG. 4 is a side elevation of the container of FIG. 3.

As shown in FIG. 2, the production mold including components 1–5 and 1a–5a is used for simultaneously manufacturing two bottle-shaped containers of the type illustrated in FIGS. 3 and 4.

A blowing and filling mandrel 6 which can be raised and lowered is provided above the production mold and it can be located on a special support (not shown) or on a permanent bridge 7, in the form of a frame, to which an extruder (not shown) is also fastened.

Bridge 7 supports a piston and cylinder assembly 9 having a vertical working axis which is supported on a transverse strut 8 with the piston rod of the piston and cylinder assembly being attached to a vertically slideable carriage 10. Guide bars 11 which are attached to opposite sides of strut 8, serve as guides for the movement of carriage 10.

A further piston and cylinder assembly 12 disposed to operate in a horizontal axis is attached to the vertically slideable carriage 10, the piston rod of assembly 12 passing through carriage 10 and being connected to a horizontally slideable carriage 14 which is guided by horizontally extending guide bars 13. A limiting element 15 is fastened to bridge 7 and serves to limit the extent of downward movement of carriage 10 and works together with horizontally slideable carriage 14 in one end position, as illustrated, but is inactive when carriage 14 is in its other end position.

A peg-shaped holding device 17, disposed along a vertical axis, is attached to the horizontally slideable carriage 14, on the end thereof opposite assembly 12, by means of a support 16, the holding device having a central conduit which can be selectively connected to a vacuum source, the conduit terminating in an inwardly extending recess shaped and dimensioned to receive a portion of a rubber stopper 18. The stopper, which is held by a collar, is disposed in a receiving position in a hole in a delivery slide 19. Because the production mold has two working cavities, a holding device 17 and a delivery slide 19 with a hole therethrough to receive a rubber stopper 18 is provided for each working cavity.

A rectangularly shaped limiting element is fastened to support 16 between the two holding devices 17 and, when the holding devices are moved to their operative positions in the molds, engages in recesses 21 and 21a of lower mold parts 1, 1a and limits the displacement movement of the top mold parts 5 and 5a toward each other.

Delivery slide 19 can be displaced horizontally in a direction perpendicular to the direction of movement of horizontally slideable carriage 14 by means of a horizontally disposed piston and cylinder assembly 22 (FIG. 2) and, as shown in FIG. 1 for stopper 18, it has a recess for each of the two rubber stoppers which it receives The two recesses can be delivered one after the other under conveyor strip 23 which is supported, or forms part of, a vibration conveyor, not shown, from which two rubber stoppers 18 are delivered to delivery slide 19 with each work operation. The top of conveyor strip 23 is covered.

The lowered part of blowing and filling mandrel 6, vertically slideable carriage 10, horizontally slideable carriage 14, the two holding devices 17 and conveyor strip 23, as well as the individual components associated with them, are located in a chamber which is enclosed and sealed on all sides by sheet metal housing 24, the upper part of the chamber not being visible in the drawings. Sheet metal housing 24, as well as conveyor strip 23, can be charged with a sterilizing agent such as super heated steam, a disinfection liquid, sterilizing gas, or the like for initial and continuous sterilization so that sterile filling of the container with filling material (FIGS. 3 and 4) and the sterilization of the rubber stoppers 18 located in strip 23 is possible.

The filled and closed container 251 is shown in FIGS. 3 and 4, the top part of the container having a breakable closing device 261 and a rubber stopper 18 which is inserted in the top part, or head, of the container entirely enclosed by material of the container 251. The top part of the container fits against the outside of the rubber stopper up to a middle portion which is accessible after the breakable closing device 261 has been broken off, so that rubber stopper 18 can be pierced directly by an injection needle or the like.

To manufacture container 251, a parison is formed, the parison being a length of hose of polymeric material, such as polyethylene, which is extruded by an extruder, not shown, and grasped at its upper end by vacuum holding fixtures 3, 3a and lower mold parts 1, 1a, and the portion of the plastic hose located in and between the lower mold halves 1, 1a is inflated until it constitutes the bulging portion, or body, of a container. The body of the container is then filled with a filling material, the blowing and filling being accomplished through mandrel 6. After the body of the container is filled, rubber stopper 18 which is held by holding device 17 is inserted in the upper part of the body of the container. This is accomplished by the holding devices 17 each receiving a rubber stopper from delivery slide 19 by lowering carriage 10 until carriage 14 strikes the limiting element 15, whereupon holding devices 17 are again raised. The holding devices 17 are then moved horizontally into a coaxial position with the body of the container and with the remaining, unshaped, plastic hose which extends upwardly from the formed body, by displacing the horizontally slideable carriage 14. The holding devices are then lowered until the rubber stoppers carried thereby assume the position shown in FIG. 1 in which each stopper is in the upper part of the completed container body. The top mold parts 5, 5a are separated to their open positions as shown in FIG. 1 during this portion of the operation.

Inside each of the upper mold parts 5, 5a is a mold holding fixture 25, 25a which can be displaced parallel to the axis of piston rod 4 or 4a. A spring 26 is inserted between mold holding fixture 25 and top mold part 5, and it urges molding fixture 25 in the direction of fixture 25a located opposite it, a spring 26a accomplishing the same task on the other side of the top mold structure. The extent of movement through which fixtures 25, 25a are displaced in mold part 5 or 5a is terminated by a mechanical stop member.

After the rubber stopper 18 has been inserted in the previously formed body portion of the container and in the as yet unshaped portion of the plastic hose, the lop mold parts 5, 5a are moved toward each other until they engage the limiting element 20 which is located, as previously described, between the two holding devices 17 which remain, at this stage, in the unformed portion of the hose. Element 20 simultaneously catches in recesses 21, 21a of lower mold parts 1, 1a. As a result, the running together of mold parts 5, 5a is limited. Mold holding fixtures 25, 25a however, can come sufficiently close to each other, that under the action of springs 26, 26a they engage the outer circumference of the heat-sealable plastic hose and a part of the top of the rubber stopper which has a projection in the middle of its upper face which remains free.

After the piston and cylinder assembly associated with rods 4, 4a have been relieved of their load, limiting element 20 can be removed from its position between upper mold parts 5, 5a by raising the holding devices 17. The upper mold parts then close, and the part of the head of container 251 having the breakable closing device is produced by application of an external vacuum. The containers manufacture in the two mold working cavities are ejected by opening the upper and lower mold part 1, 1a and 5,5a and also the vacuum holding fixtures 3, 3a, allowing the formed, filled and sealed containers to drop out.

Although the embodiment described herein has two working cavities, it will be apparent that any number of cavities can be used.

It will also be recognized that the mold holding fixtures 25, 25a can be moved by means of piston and cylinder assemblies coupled thereto, in which case springs 26, 26a can be omitted.

As will be seen, the simple manufacturing process described herein calls for a less complicated apparatus, and consequently an apparatus which is less susceptible to trouble. The rubber stopper is introduced into the plastic hose in a work operation carried out between the filling and closing of the container and, when the container is finished, it is closed off completely from the outside by the container material so that no subsequent contamination of the rubber stopper can take place. When filling is carried out in a sterile manner, the sterility of the contents of the container continues to exist for a long time. If required, the container can be again sterilized subsequently. If the container has a breakable closing device providing free access to the rubber stopper, it is not necessary to pierce the head of the container with an injection needle.

While certain advantageous embodiments have been chosen to illustrate the invention it will be understood by those skilled in the art that various changes and modifications can be made therein without departing from the scope of the invention as defined in the appended claims.

What is claimed is:

1. A method of molding, top filling, and sealing a container in an apparatus to provide a sterile product within the sealed container and to mold an auxiliary component as an integral part of the top of the container, all in a continuous operation wherein the apparatus includes:
   (a) a split mold assembly having two coacting first or main mold halves defining a first cavity for the container body, two coacting second or upper sealing mold halves above said two first mold halves defining a second cavity communicating with said first cavity for receiving therein said auxiliary component and molding it into the top of said container, and two coacting third mold halves above said two second mold halves;
   (b) a pair of vacuum operable holding jaws having an inner surface for gripping a parison; and
   (c) a blowing and filling assembly for sealingly engaging said parison, for subsequently discharging presurized gas into said pairson for blow molding the container, and for subsequently dispensing a product into the molded container;
   (A) opening said first and second mold halves;
   (B) extruding a parison in the form of an elongated hollow tube vertically between said first and second mold halves to extend below and above said first and second mold halves;
   (C) gripping with said vacuum operable jaws the upper portion of the parison by a reduced pressure effected between the outer surface of the parison and said inner surface of said jaws to maintain an opening in the upper portion of said parison above said second mold halves;
   (D) closing said first mold halves about said parison to confine a portion of said parison therebetween while maintaining an opening in the upper portion of said parison with said holding jaws;
   (E) severing said parison above said holding jaws to provide a top opening at the end of the upper portion of the severed length of parison adapted to receive in seriatim said blowing and filling assembly and said auxiliary component;
   (F) extending said blowing and filling assembly through said top opening at the end of the upper portion of the severed length of parison to seal said top opening with the assembly pressing the parison against the first mold halves;
   (G) blowing gas into said parison from said blowing and filling assembly to mold said container;
   (H) venting said molding container;
   (I) discharging a product into said molded container from said blowing and filling assembly to fill said container;
   (J) retracting said blowing and filling assembly from said top opening of said parison;
   (K) holding said auxiliary component at the bottom of a cylindrical arm and positioning said auxiliary component within said parison top opening adjacent said second mold halves;
   (L) closing said second mold halves about both said auxiliary component and the surrounding parison to compress the parison between the exterior surfaces of the auxiliary component and the interior surfaces of said second mold halves to hermetically seal the formed and filled container about at least a portion of the auxiliary component;
   (M) withdrawing said cylindrical arm and closing said third mold halves about said parison above said auxiliary component to seal said parison so as to form a sealed cavity above said auxiliary component and so as to form a tab extending above said cavity which may be grasped and to which force may be subsequently applied to break said tab providing access to said auxiliary component;
   (N) forming a frangible or breakable portion in said parison adjacent said auxiliary component for facilitating access to said auxiliary component upon breaking said tab; and
   (O) opening said mold halves to expose the formed, filled, and hermetically sealed container with the auxiliary component integrally molded therewith.

* * * * *